(12) United States Patent
Hsu et al.

(10) Patent No.: US 8,360,602 B2
(45) Date of Patent: Jan. 29, 2013

(54) TROLLY AND ILLUMINATION MODULE THEREOF

(75) Inventors: Hsi-Chuan Hsu, Taipei County (TW); Chia-Hao Liang, Taipei County (TW); Jen-Ta Chiang, Taipei County (TW)

(73) Assignee: Everlight Electronics Co., Ltd., New Taipei (TW)

( * ) Notice: Subject to any disclaimer, the term of this patent is extended or adjusted under 35 U.S.C. 154(b) by 447 days.

(21) Appl. No.: 12/788,195

(22) Filed: May 26, 2010

(65) Prior Publication Data
US 2010/0302776 A1 Dec. 2, 2010

(30) Foreign Application Priority Data
May 27, 2009 (TW) .............................. 98117700 A

(51) Int. Cl.
*F21V 9/00* (2006.01)
*F21V 1/00* (2006.01)
*H01J 1/62* (2006.01)
*H01J 63/04* (2006.01)

(52) U.S. Cl. ......... 362/231; 362/235; 362/227; 313/501

(58) Field of Classification Search .................. None
See application file for complete search history.

(56) References Cited

U.S. PATENT DOCUMENTS
2011/0279015 A1* 11/2011 Negley et al. ................. 313/501

FOREIGN PATENT DOCUMENTS
TW         I231852         5/2005

* cited by examiner

*Primary Examiner* — Natalie Walford

(57) ABSTRACT

A trolley is provided, including an illumination module disposed in a frame having a plurality of plates, wherein the illumination module includes a plurality of light emitting diodes disposed on the second surface of each plate, and each light emitting diode comprises a red light chip providing 75% to 85% of it's total light energy, a green light chip providing 5% to 15% of it's total light energy and a blue light chip providing 5% to 15% of it's total light energy.

16 Claims, 4 Drawing Sheets

TROLLY AND ILLUMINATION MODULE THEREOF

CROSS REFERENCE TO RELATED APPLICATIONS

This Application claims priority of Taiwan Patent Application No. 98117700, filed on May 27, 2009, the entirety of which is incorporated by reference herein.

BACKGROUND OF THE INVENTION

1. Field of the Invention

The invention relates to a trolley for transporting plants, and in particular relates to a trolley equipped with illumination modules emitting light to the plants.

2. Description of the Related Art

When plants are transported, the plants, in containers, are disposed on a trolley. In general, the trolley is equipped with cold cathode fluorescent lamps for illumination of the plants. However, cold cathode fluorescent lamps emit heat which may damage the plants. Therefore, light emitting diodes (LEDs) have been used, which emit less heat, to illuminate plants in trolleys.

However, LEDs emitting light with different wavelengths are not optimum for cultivating healthy plants.

BRIEF SUMMARY OF INVENTION

Thus, it is desired to develop an optimal combination of light emitting diodes (LEDs), to emit light that may cultivate healthy plants, with no pollution, minimal bacteria growth, low nitrate production, no insecticides and no heavy metal production.

The object of the invention is to provide a trolley equipped with illumination modules comprising LEDs. Light from the LEDs is provided for plants and heat from the LEDs also conducted to plants to regulate the air temperature for the plants.

An embodiment of the trolley of the invention comprises: a frame; a plurality of plates disposed on the frame and separated by an appropriate distance, wherein each plate has a first surface and a second surface, and the first surface of one plate faces the second surface of an adjacent plate, and plants are disposed on the first surface; a plurality of illumination modules disposed on the second surface of each plate, wherein each illumination module comprises a plurality of light emitting diodes, and each light emitting diode comprises a red light chip providing 75% to 85% of it's total light energy, a green light chip providing 5% to 15% of it's total light energy and a blue light chip providing 5% to 15% of it's total light energy; and a plurality of heat dissipation modules corresponding to the illumination modules and disposed between the illumination modules and the second surface of each plate, wherein light from the illumination modules illuminates plants and heat from the illumination modules is conducted to the second surface by the heat dissipation modules to heat the air between two adjacent plates.

Each illumination module comprises a plurality of light emitting diodes arranged in a two dimensional matrix.

Each heat dissipation module comprises: a stainless steel plate contacting the plates; and a plurality of aluminum blocks connected to the stainless steel plate, wherein the light emitting diodes are disposed on the aluminum blocks, and heat from the light emitting diodes is conducted to the first surface by the aluminum blocks and the stainless steel plates.

Each illumination module further comprises an optical lens and a cover, and light from the light emitting diodes penetrates the optical lens and the cover to illuminate the plants. The optical lens can be a Batwing lens.

The red light chip emits light having a wavelength ranging from 640 nm to 670 nm.

The blue light chip emits light having a wavelength ranging from 445 nm to 460 nm.

The green light chip emits light having a wavelength ranging from 525 nm to 535 nm or from 535 nm to 545 nm.

The red light chip, the green light chip and the blue light chip provide 80%, 10% and 10% of its total light energy, respectively.

By regulating energy proportions of the red light chip, the green light chip and the blue light chip, more efficient and healthy illumination may be provided to plants.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
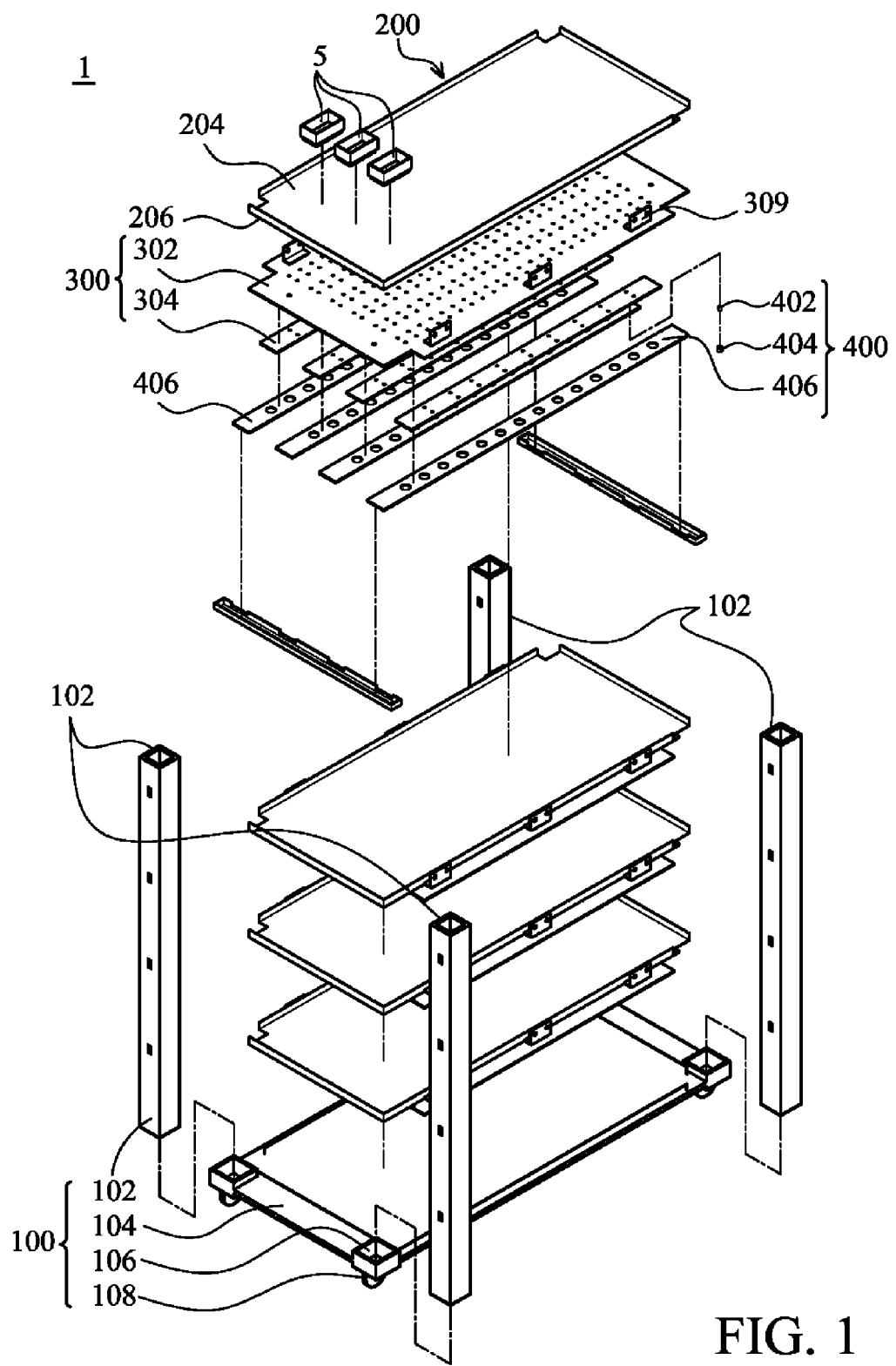
FIG. 1 is an explosive view of a trolley of the invention.
Figure 2:
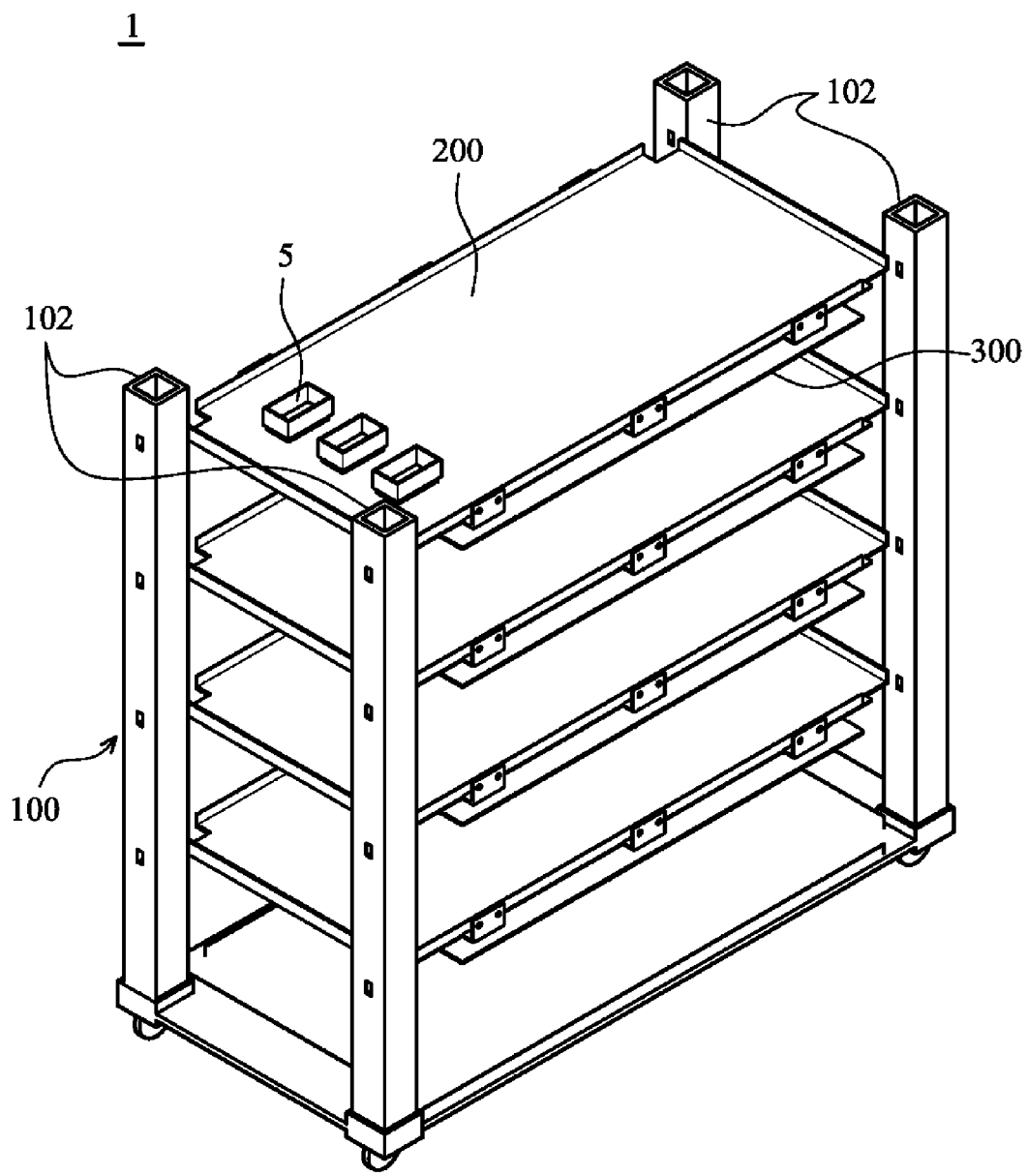
FIG. 2 is an assembly view of the FIG. 1.

Referring to FIGS. 1 and 2, a trolley 1 of the invention comprises a frame 100, a plurality of plates 200 which is made of metal, a plurality of heat dissipation module 300 and a plurality of illumination modules 400.

The frame 100 is formed by inserting four columns 102 into four holes 106 on four corners of a bottom 104. The bottom 104 has four wheels 108, whereby the frame 100 moves.

The metal plate 200 is rectangular and joined to the columns 102, whereby the plates 200 are disposed on the frame 100. The plates 200 are separated by an appropriate distance. Each plate 200 has a first surface 204 and a second surface 206. Containers 5 with plants are disposed on the first surface 204. The second surface 206 of one plate 200 faces the first surface 204 of the adjacent plate 200.

Figure 3:
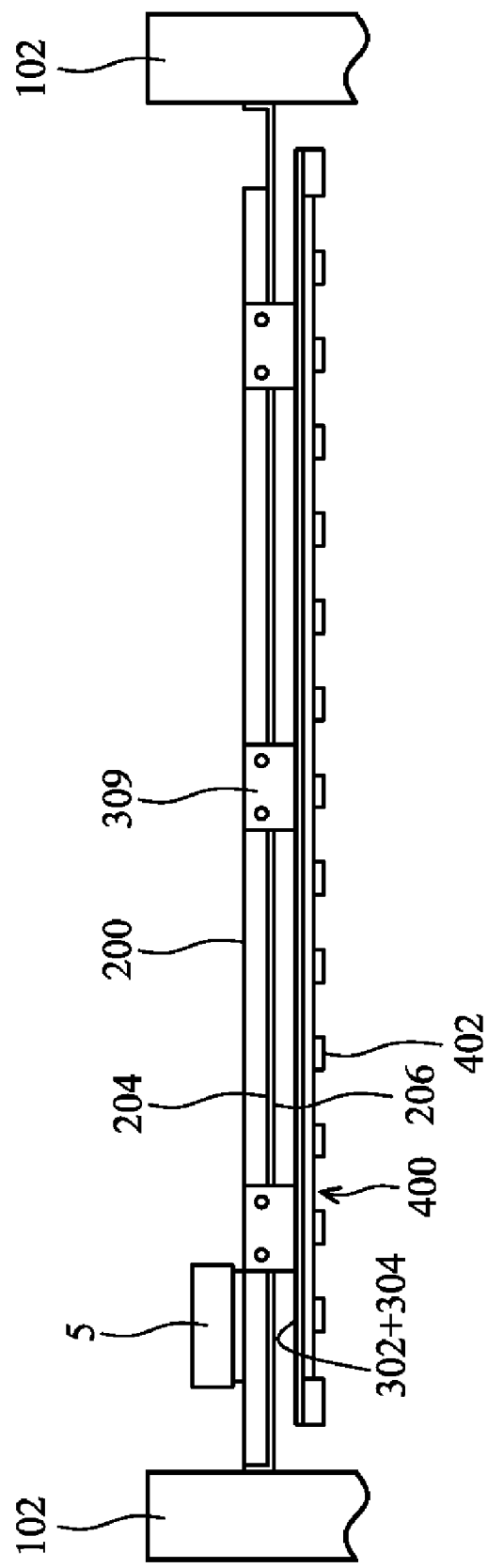
FIG. 3 depicts a plate of the trolley of FIG. 1.

The heat dissipation module 300 comprises a stainless steel plate 302 and a plurality of aluminum blocks 304. The stainless steel plate 302 contacts the second surface 206, and the aluminum blocks 304 are joined to the stainless steel plate 302, as shown in FIG. 3. The stainless steel plate 302 is joined to the plate 200 by connectors 309.

Referring to FIG. 1, the illumination module 400 comprises a plurality of light emitting diodes 402 arranged in a two dimensional matrix and joined to the aluminum blocks 304. It is noted here that only one light emitting diode is shown in FIG. 1 for clarity. The illumination module 400 further comprises an optical lens 404 and a cover 406. The optical lens 404 disposed above the light emitting diode 402, and the cover 406 covers the optical lens 404. Light from the light emitting diode 402 penetrates the optical lens 404 and the cover 406 to illuminate the plants. Since the light from the light emitting diode 402 has a larger intensity at the central portion of the emitting area, the Batwing lens is preferred to be used for a more uniformed light illumination. The Batwing lens is able to decrease the light intensity at the central portion of the emitting area and increase the light intensity at the edge portions. When light passes through the Batwing lens, light intensity is regulated to be uniform. The cover 406 protects the light emitting diode 402. Additionally, a light diffusion structure or concentration structure can also be formed on the cover 406.

Figure 4:
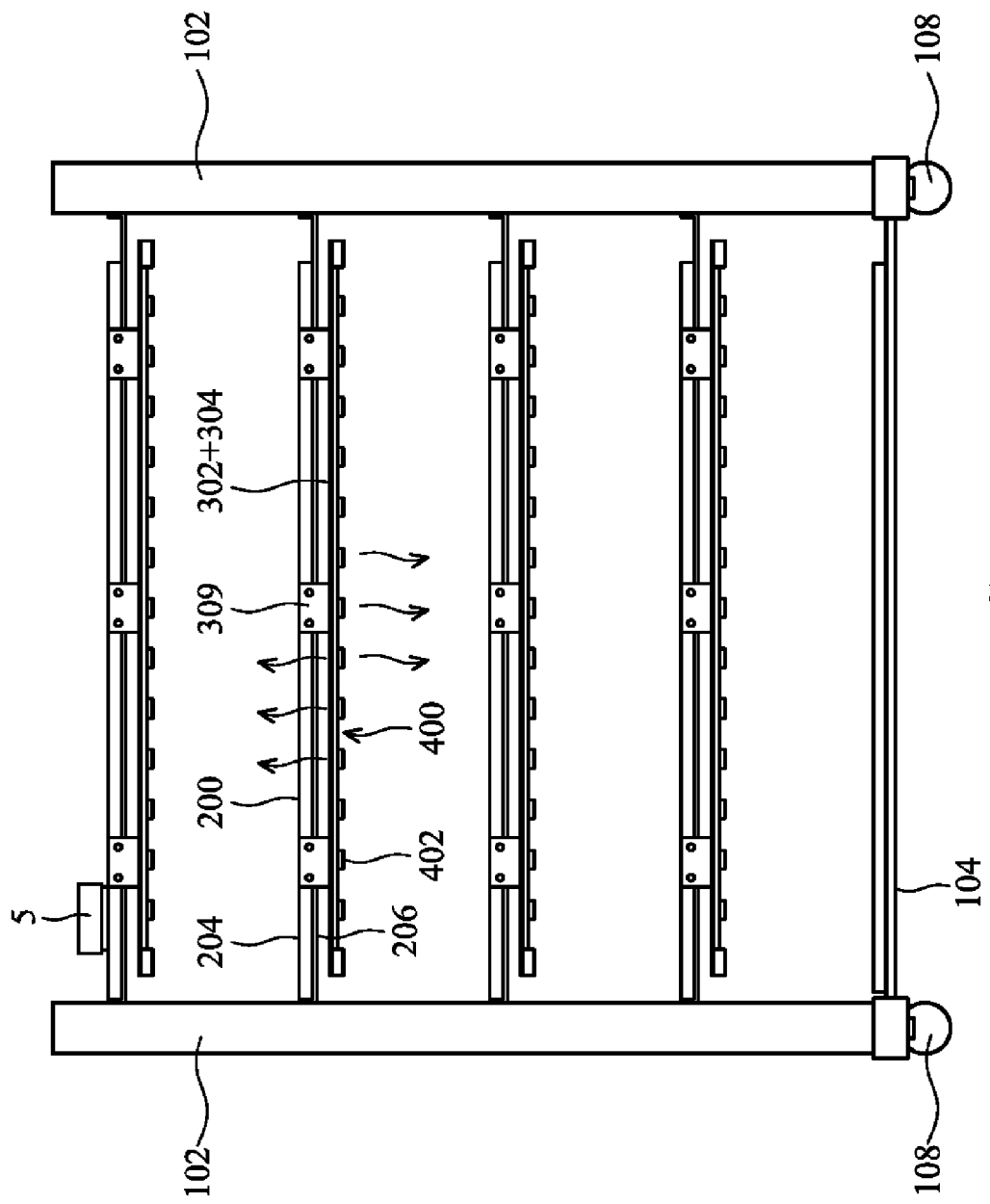
FIG. 4 is a side view of FIG. 2.

Referring to FIGS. 3 and 4, light from the light emitting diode 402 on the second surface 206 of one plate 200 illuminates plants on the first surface 204 of the next below plate 200. The heat generated by the light emitting diode 402 is conducted to the first surface 204 of the plate 200 by the aluminum block 304 and the stainless steel plate 302 to heat the air between two plates 200, whereby the temperature of the air for the plants can be regulated. The trolley 1 of the invention provides light for illumination and also provides heat for temperature regulation, whereby the plants may healthily grow.

The light emitting diode 402 in the embodiment comprises a red light chip, a green light chip and a blue light chip disposed in a package. To cultivate plants and reduce nitrates in the plants, the wavelength of the light from the red light chip ranges from 640~670 nm and has a peak value of 660 nm. The wavelength of the light from the blue light chip ranges from 450~460 nm and has a peak value of 450 nm. The wavelength of the light from the green light chip ranges from 525~535 nm and has a peak value of 530 nm, or the wavelength of the light from the green light chip ranges from 545~555 nm and has a peak value of 550 nm. The red light chip provides 75% to 85% of its total light energy, the green light chip provides 5% to 15% of its total light energy and the blue light chip provides 5% to 15% of its total light energy. To reduce nitrate in the plants, the red light chip, the green light chip and the blue light chip provide 80%, 10% and 10% of its total light energy, respectively. For example, optimal conditions may be provided by the trolley equipped with illumination modules of the invention to grow lettuce, wherein light illumination may be 100 $\mu$mol/m$^2$/s and light illumination and darkness may be alternated between 20 hours and 4 hours, respectively. Additionally, nitrate may be reduced due to trolley equipped with illumination modules of the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An illumination module disposed in a frame comprising a plate, wherein the plate has a first surface and a second surface, comprising
    a plurality of light emitting diodes disposed on the second surface of the plate, wherein each light emitting diode comprises a red light chip, a green light chip and a blue light chip, the red light chip provides 75% to 85%, the green light chip provides 5% to 15% and the blue light chip provides 5% to 15% of total light energy of LED.

2. The illumination module as claimed in claim 1, wherein the red light chip, the green light chip and the blue light chip provide 80%, 10% and 10% of total light energy of LED, respectively.

3. The illumination module as claimed in claim 1, wherein each light emitting diode comprises an optical lens.

4. The illumination module as claimed in claim 3 further comprising a cover covering each light emitting diode.

5. The illumination module as claimed in claim 1, wherein the red light chip emits light having a wavelength ranging from 640 nm to 670 nm.

6. The illumination module as claimed in claim 1, wherein the blue light chip emits light having a wavelength ranging from 445 nm to 460 nm.

7. The illumination module as claimed in claim 1, wherein the green light chip emits light having a wavelength ranging from 525 nm to 535 nm.

8. The illumination module as claimed in claim 1, wherein the green light chip emits light having a wavelength ranging from 545 nm to 555 nm.

9. A trolley for transporting plants, comprising:
    a frame;
    a plurality of plates disposed on the frame and separated by an appropriate distance, wherein each plate has a first surface and a second surface and the first surface of one plate faces the second surface of an adjacent plate, and plants are disposed on the first surface;
    a plurality of illumination modules disposed on the second surface of each plate, wherein each illumination module comprises a plurality of light emitting diodes, and each light emitting diode comprises a red light chip, a green light chip and a blue light chip, the red light chip provides 75% to 85%, the green light chip provides 5% to 15% and the blue light chip provides 5% to 15% of total light energy of LED; and
    a plurality of heat dissipation modules corresponding to the illumination modules and disposed between the illumination modules and the second surface of each plate, wherein light from the illumination modules illuminates plants and heat from the illumination modules is conducted to the second surface by the heat dissipation modules to heat the air between two adjacent plates.

10. The trolley as claimed in claim 9, wherein the red light chip, the green light chip and the blue light chip provide 80%, 10% and 10% of total light energy of LED, respectively.

11. The trolley as claimed in claim 9, wherein each heat dissipation module comprises:
    a stainless steel plate contacting the plates; and
    a plurality of aluminum blocks connected to the stainless steel plate, wherein the light emitting diodes are disposed on the aluminum blocks, and heat from the light emitting diodes is conducted to the first surface by the aluminum blocks and the stainless steel plates.

12. The trolley as claimed in claim 9, wherein each illumination module further comprises an optical lens and a cover, and light from the light emitting diodes penetrates the optical lens and the cover to illuminate the plants.

13. The trolley as claimed in claim 9, wherein the red light chip emits light having a wavelength ranging from 640 nm to 670 nm.

14. The trolley as claimed in claim 9, wherein the blue light chip emits light having a wavelength ranging from 445 nm to 460 nm.

15. The trolley as claimed in claim 9, wherein the green light chip emits light having a wavelength ranging from 525 nm to 535 nm.

16. The trolley as claimed in claim 9, wherein the green light chip emits light having a wavelength ranging from 545 nm to 555 nm.

* * * * *